Jan. 15, 1929.
J. M. HOTHERSALL
1,698,999
NECKING-IN OR REFORMING TUBULAR BODIES
Filed Jan. 24, 1927  8 Sheets-Sheet 1
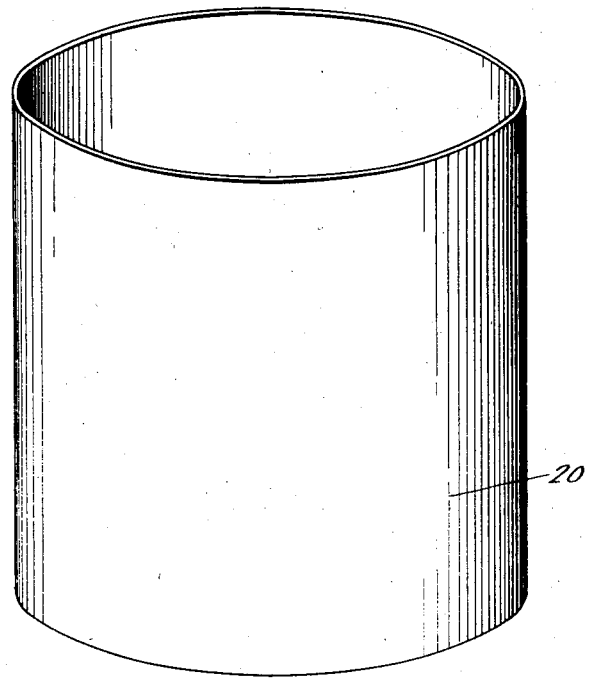
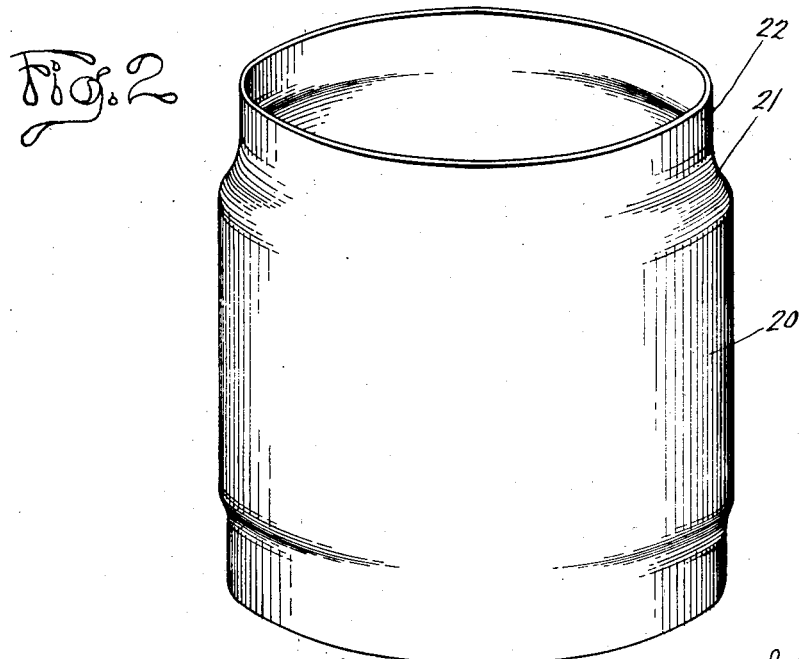
INVENTOR
John M. Hothersall
BY Munday, Clarke &
Carpenter
ATTORNEYS Jan. 15, 1929. 1,698,999
J. M. HOTHERSALL
NECKING-IN OR REFORMING TUBULAR BODIES
Filed Jan. 24, 1927 8 Sheets-Sheet 2

INVENTOR
John M. Hothersall
BY Munday, Clarke & Carpenter
ATTORNEYS

Jan. 15, 1929.　　　　　　　　　　　　　　　　1,698,999
J. M. HOTHERSALL
NECKING-IN OR REFORMING TUBULAR BODIES
Filed Jan. 24, 1927　　　　8 Sheets-Sheet 3
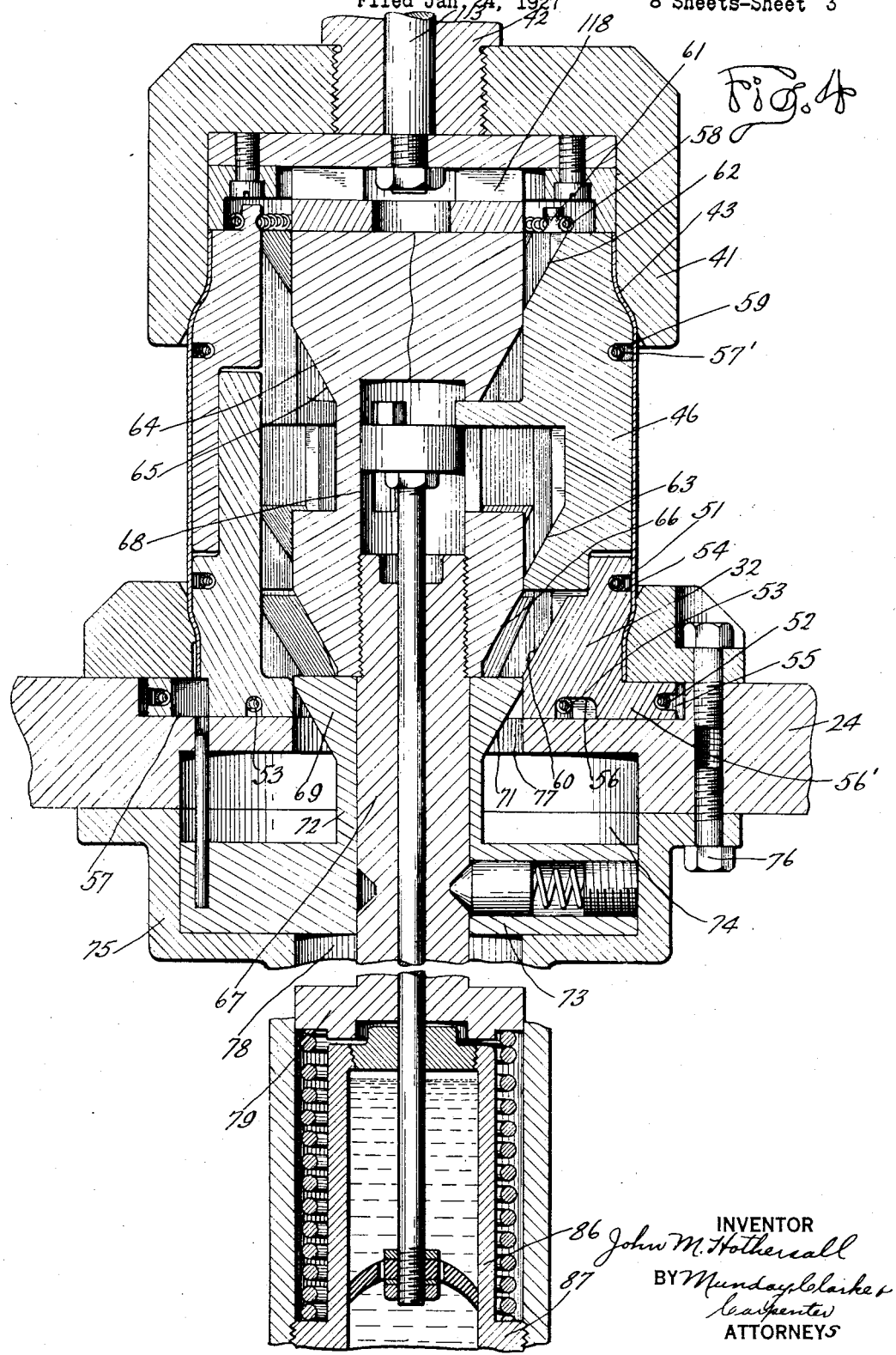
INVENTOR
John M. Hothersall
BY Munday, Clarke &
Carpenter
ATTORNEYS

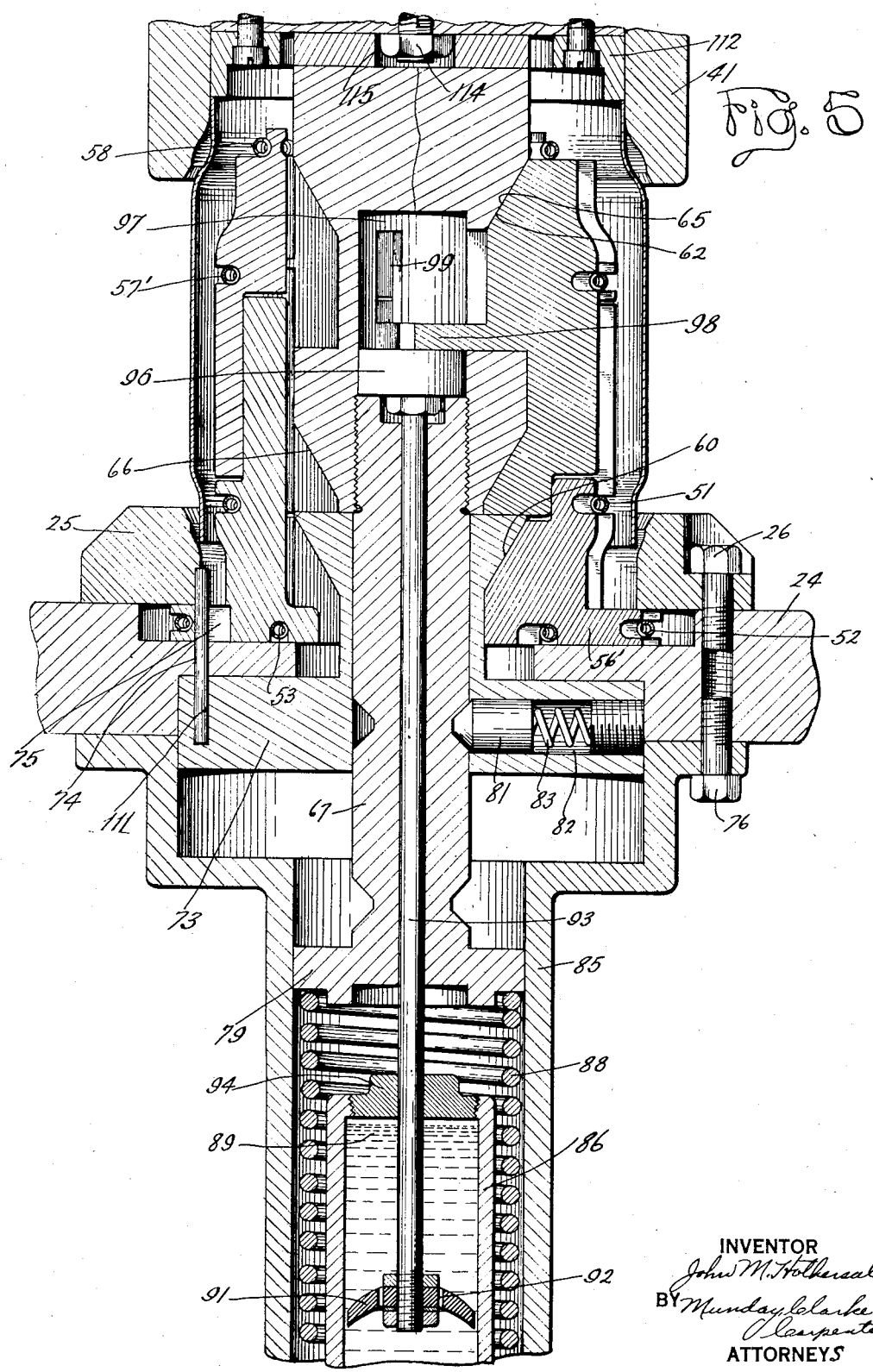

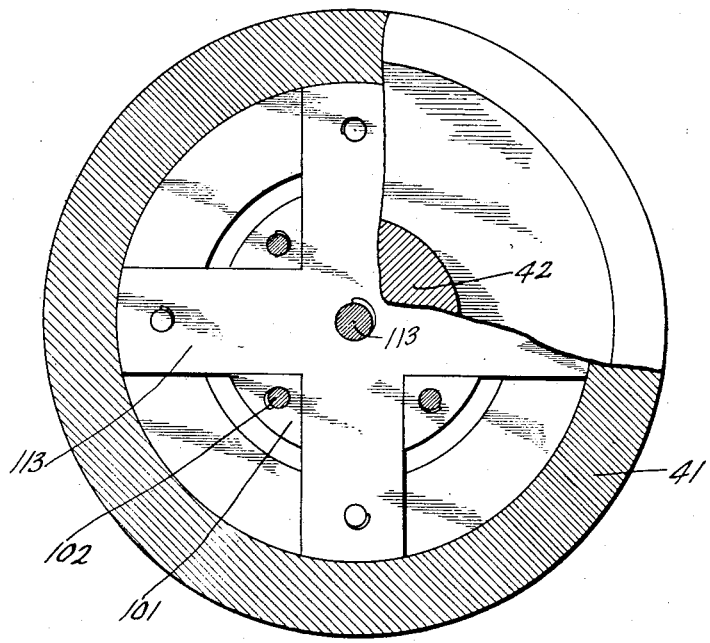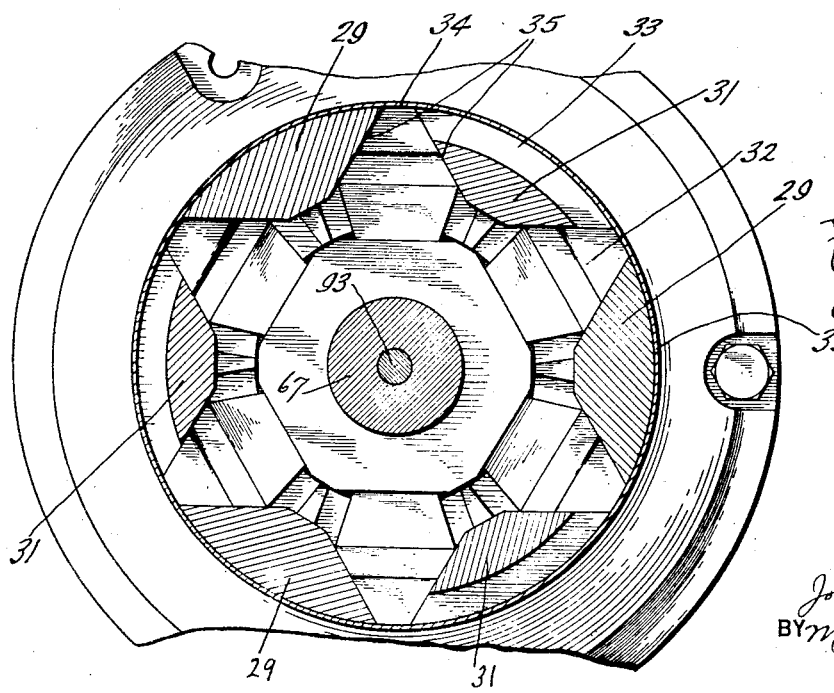

Jan. 15, 1929.
J. M. HOTHERSALL
1,698,999
NECKING-IN OR REFORMING TUBULAR BODIES
Filed Jan. 24, 1927    8 Sheets-Sheet 6
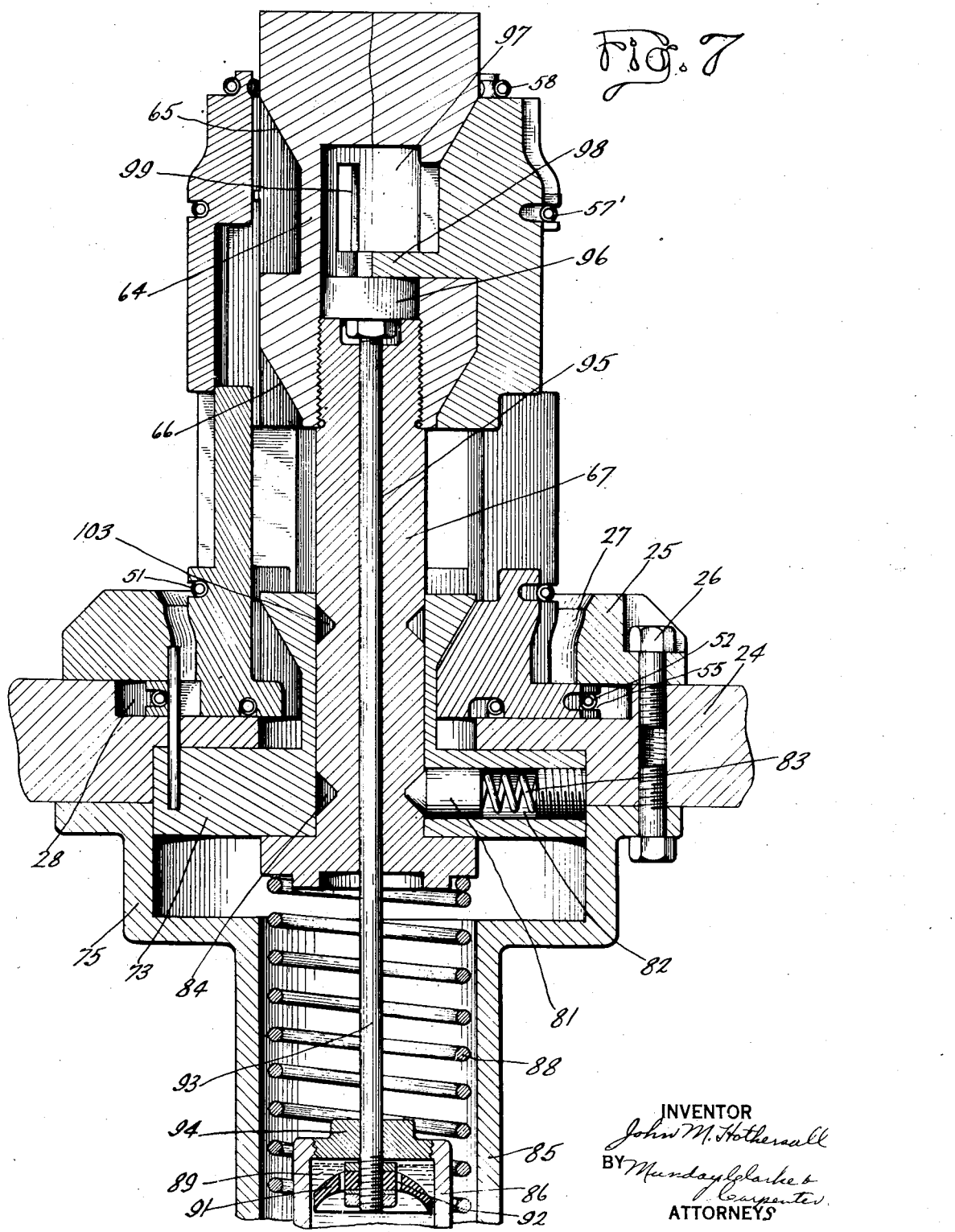

Jan. 15, 1929.   1,698,999
J. M. HOTHERSALL
NECKING-IN OR REFORMING TUBULAR BODIES
Filed Jan. 24, 1927   8 Sheets-Sheet 7
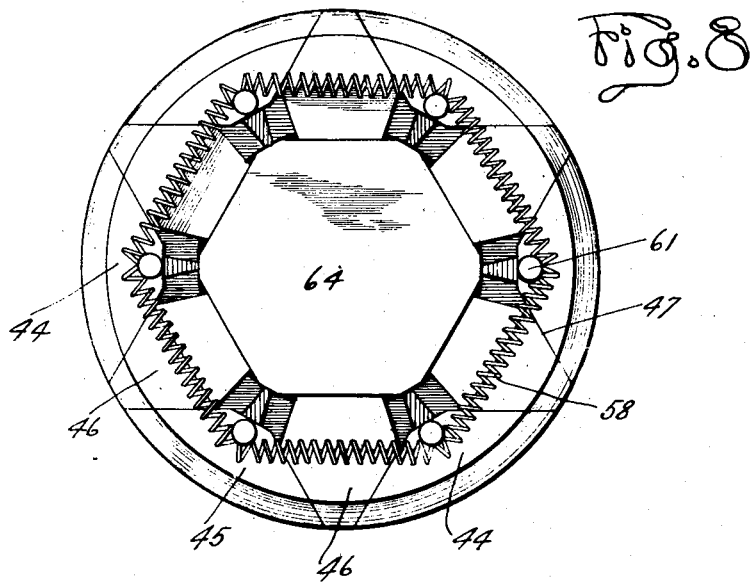
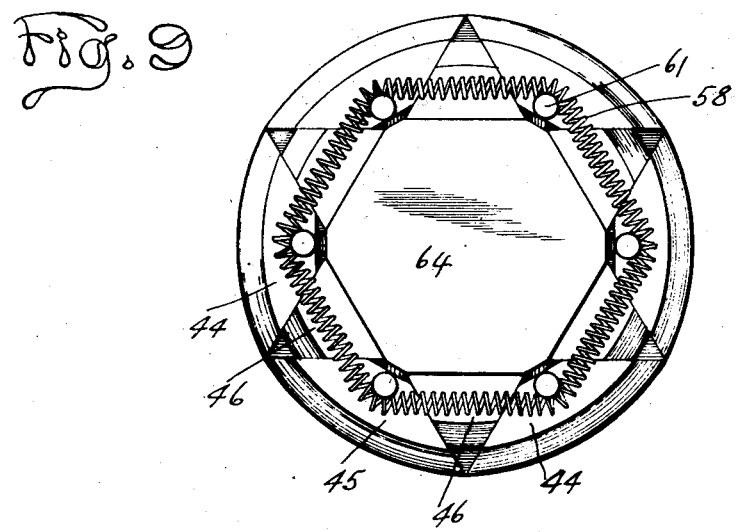
INVENTOR
John M. Hothersall
BY Munday, Clarke & Carpenter
ATTORNEYS Jan. 15, 1929.

J. M. HOTHERSALL 1,698,999

NECKING-IN OR REFORMING TUBULAR BODIES

Filed Jan. 24, 1927 8 Sheets-Sheet 8

John M. Hothersall
INVENTOR

BY Munday, Clarke &
Carpenter
ATTORNEYS

Patented Jan. 15, 1929.

1,698,999

UNITED STATES PATENT OFFICE.

JOHN M. HOTHERSALL, OF BROOKLYN, NEW YORK, ASSIGNOR TO AMERICAN CAN COMPANY, OF NEW YORK, N. Y., A CORPORATION OF NEW JERSEY.

NECKING-IN OR REFORMING TUBULAR BODIES.

Application filed January 24, 1927. Serial No. 162,951.

This invention relates to the reformation of the ends of tubular bodies as, for example, cans and containers, to alter their shape and/or dimension, and while the invention has more particular reference to the reducing or necking-in of the previously formed can or container bodies, it will be manifest that the invention has other and valuable application.

In the manufacture of heavy duty containers, as lead kegs and the like, of sheet metal, wherein the contents is frequently so heavy as to require the rolling of the body, it is desirable that the seams and connections between the bodies and end closures be protected in the rolling action.

I am aware that it has been old to so neck the bodies as to set the outer dimensions of the seams within the outer diameter of the body for this purpose. My invention, however, contemplates this operation through the use of a new and improved process, and a new and improved apparatus, both designed to provide a higher degree of perfection of product and a more economical production thereof. Heretofore the necking-in operation, both of heavy duty and other containers, has been accomplished either by the use of rolls or by laterally moving dies. The use of the rolls is both limited in its application and has failed to produce nicely accurate results. It has moreover been a process relatively slow, since the rolls must travel continuously around the container circumference and can only operate successively at single points.

The laterally moving dies or squeezer jaws employed to neck-in can bodies or containers, particularly the heavy duty type, prior to my invention, have uniformly applied the necking-in forces at right angles to the walls of the containers, with the result that slight reduction only in heavy containers has been possible, and because of the elasticity these reductions have not always been accurate. My invention contemplates the forcing of the end or ends of the container through one or two passes, as may be required, which passes are of reduced diameter to effect the necking-in operation through forces applied generally in the plane of the container body so that at the end of the operation the end or ends of the body are of fixed predetermined shape and may be of greater reduction or change of dimension than has heretofore been practical commercially.

An important object of my invention is the provision of an improved process and apparatus which will reform or reshape to desired form and dimension of one or both ends of a tube of heavy sheet material with greater accuracy and at less cost than has heretofore been usual.

Another important object of the invention is the provision of a new process and apparatus which will permit of the employment of greater forces without danger to the tubular body being treated, and without danger also to the parts of the apparatus accomplishing this result.

Another important object of the invention is the provision of an apparatus of the character set forth, which will consist only of sturdy parts unlikely to require frequent repair, replacement or readjustment.

Numerous other objects and advantages of the invention will be apparent as it is better understood from the following description, which, taken in connection with the accompanying drawings, discloses a preferred embodiment thereof.

Referring to the drawings:

Figures 1 and 2 are perspective views illustrating, respectively, a tube or container body before and after it has been subjected to the apparatus shown in the other figures in accordance with my improved process;

Figs. 3, 4, and 5 are longitudinal sectional views through a reforming organization or apparatus embodying my invention and showing successive steps of the reforming.

Fig. 6 is a section taken substantially on the line 6—6 of Fig. 3;

Fig. 7 is a view similar to Figs. 3 to 5, showing the parts as arranged before the action or before the tubular body is placed in reforming position.

Figs. 8 and 9 are top plan views of the upper internal pass forming members, showing the parts, respectively, expanded and contracted;

Fig. 11 is a section taken substantially on line 11—11 of Fig. 3.

Figure 3:
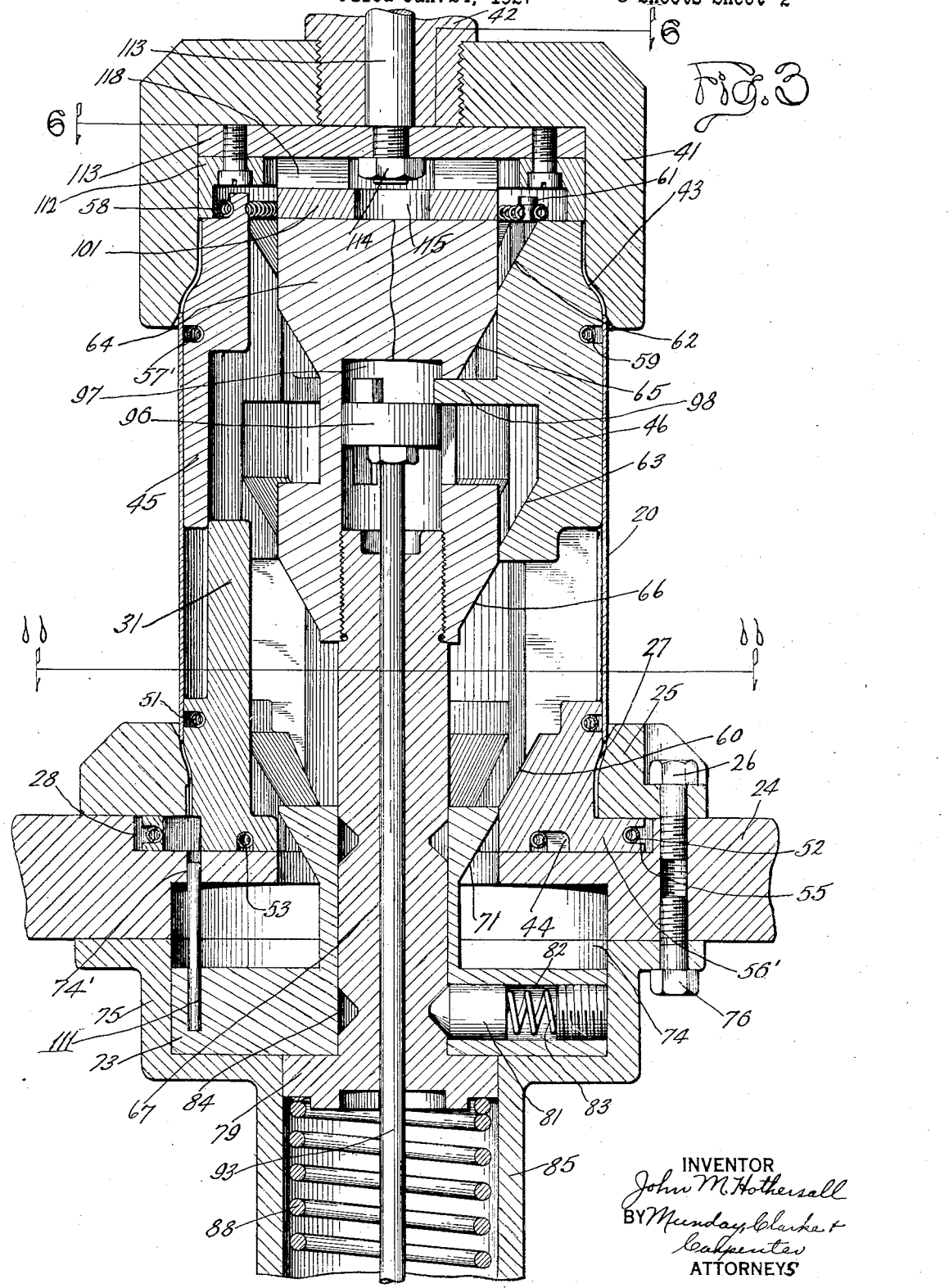

For the purpose of illustrating my invention, in Fig. 1 of the drawings, I have shown a tube or container body in the cylindrical form it possesses before being subjected to the necking-in operation in accordance with my invention. Fig. 2 shows the same after the reformation is accomplished. In these figures, the body is necked-in at both ends, and it will be noted that the body generally indicated at 20 is constricted and necked in sharply at 21 to a smaller cylindrical diameter at 22. The apparatus shown on the drawing is constructed and arranged to accomplish the necking-in of both ends of the body, and this necking-in is performed by arranging the body so that its ends are in position to enter narrow tapering passes 43 and 27 at the top and bottom, which passes are of the shape and dimension desired at the ends of the container. These passes are formed between external pass forming members 41 and 25 and companion inner pass forming members which are not given reference characters at this point in the description because they consist of a number of parts requiring individual description.

Comparing Figures 3 and 4 of the drawing, it is pointed out that the container body is first arranged about an internal organization, which terminates at its top and bottom in the internal pass forming parts. The upper external pass forming member is adapted to move vertically for the insertion and removal of the container bodies. The parts are moved from the arrangement shown in Figure 3 to that shown in Figure 4, in which movement the upper pass forming portion of the apparatus moves bodily downward, this movement driving the ends of the container bodies into and through the reforming passes. It will be noted that while this movement occurs, the interior of the body is reinforced throughout its length, the parts telescoping in such fashion as to increase the effective character of the reinforcement as the end of the reforming action is approached and reached.

When the necking-in or reforming is completed, the parts separate for the removal of the finished container body. In this separation, the entire internal organization is contracted and stays in vertical position; at least, during such contraction, and the upper external die is lifted. This lifting of the die is only partially shown in Figure 5, it being understood that it continues its upward movement until the container body may be lifted up off the internal organization (see Fig. 7).

The next relative movement of the apparatus raises the upper internal pass forming organization to the position shown in Figure 7, which is the position of the parts when a container body is being positioned for operation. The first action of the parts in the operation expands the internal pass forming members or parts into pass forming position with respect to the external pass forming members.

It will be readily understood that this operation is accomplished in a press of any usual or preferred construction, only such parts of the press, however, being shown on the drawings as are thought necessary to an understanding of the invention.

Figure 10:
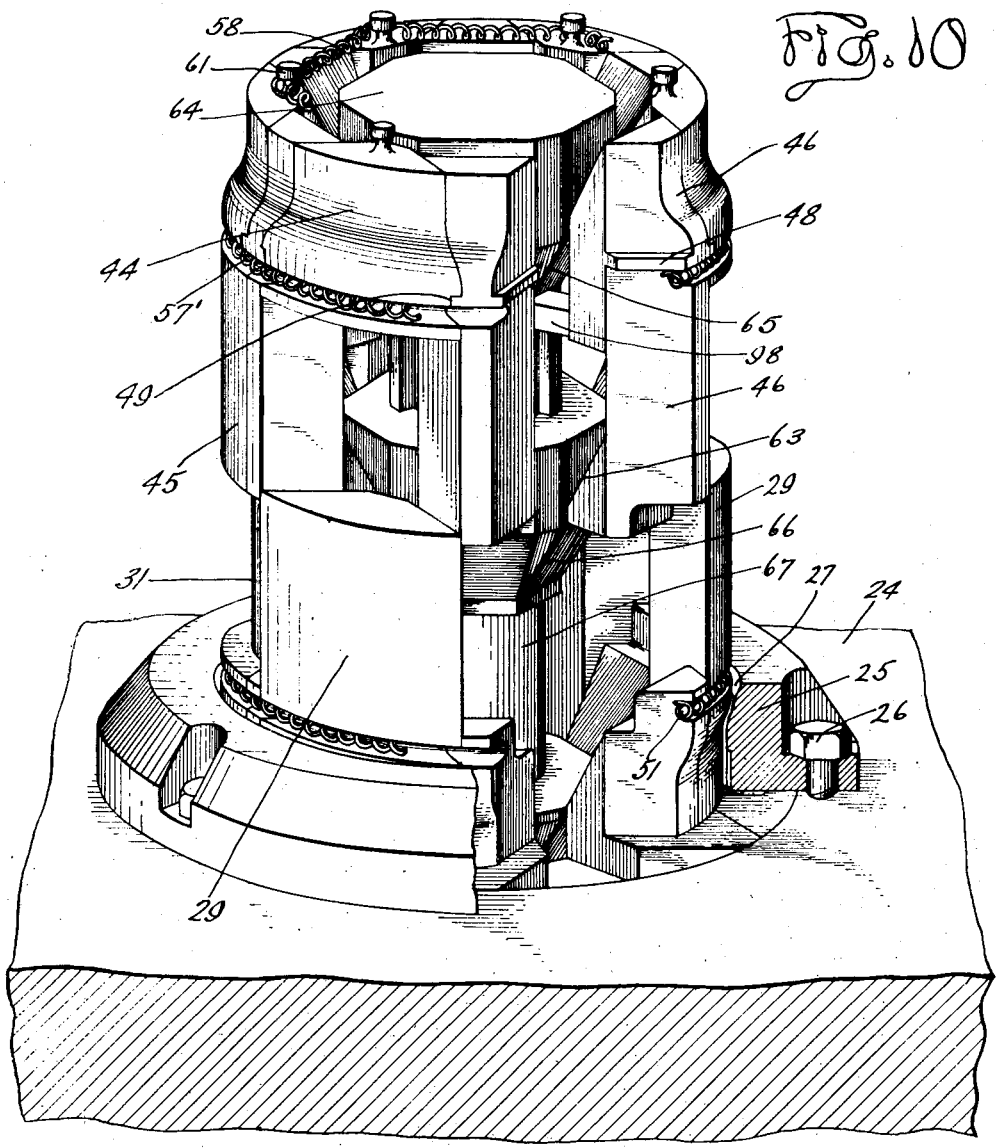
Fig. 10 is a perspective view of the apparatus with parts removed.

Referring first to Figures 7 and 10, reference character 24 indicates a fixed portion of the bed of the press and upon this the lower external pass forming member 25 is secured by bolts 26. The member 25 is of annular form and provides a continuous internal pass forming face 27 of the desired shape. The press bed is cut away at 28 to provide a recess centrally of and extending under the ring 25, and the bottom of this recess provides a bearing surface for the lower internal pass forming members in their sliding action from contracted to extended position. The lower internal pass forming members are so constructed and arranged as to present a continuous outer pass forming surface when in operative position.

Referring now to Figure 11, the lower internal pass forming members comprise, in the present instance, two sets, one composed of the members 29 and 31, and the other of members 32, individual pass forming members 32 alternating with pass forming members 29 and 31. The members 29 and 31 are alike at their operative zone, but are differently constructed thereabove for purposes to be presently explained. Pass forming members 29 and 31 are provided with relatively extended circumferential faces 33 and the members 32 with circumferential faces 34 of less extent. The pass forming members 29 and 31 are provided with adjacent inclined or beveled faces 35, which are engaged by companion wedging faces of members 32. This organization of parts is such that the narrow or minor members 32 wedgingly engage the members 29 and 31 and force them out to operative position and/or until the circumferential faces of the members 32 register with the outer circumferential faces of the members 29 and 31.

After a reforming operation, the parts are retracted through the wedging action of the members 29 and 31 pushing in the members 32 and then following themselves to a position of clearance.

The upper pass forming members are constructed similarly to the lower ones already described, and comprise a rigid outer pass forming member 41 (Figs. 3 and 4), which is threadingly engaged with a movable pocket vertically reciprocating press part 42. The member 41 is hollow and has an internal pass forming surface 43 of suitable or desired configuration.

The internal pass forming members are shown in plan in Figures 8 and 9 and consist of a set of primary or wide faced members 44 and 45, and a secondary or minor set of narrow faced pass forming members 46. The pass forming members 44 and 45 are alike throughout their operative zone, but differ in certain other respects to be later explained. The members 46 are arranged between adjacent members of the set composed of pass forming members 44 and 45 and have wedging engagement 47 therewith. These pass forming members operate in their retraction and extension in the manner already described in connection with the lower pass forming members.

The upper pass forming members are interlockingly engaged around the circumference, so that they must move vertically as a joint unit or organization. Keys or ribs 48 are formed on the sides of the minor members 46 and these engage in recesses 49 in the adjacent faces of adjacent major members. It will, of course, be understood that because of these ribs and recesses free sliding movement is permitted laterally or radially between the members of the organization.

The retraction of both the upper and lower pass forming members is accomplished by encircling springs. Three sets of springs indicated by reference characters 51, 52 and 53 are provided in grooves arranged circumferentially of all of the lower pass forming members and in such position as to not interfere with the operation of the organization. These grooves are indicated at 54, 55, and 56, respectively, the groove 54 being set into the outer circumferential faces above the pass. The grooves 55 are arranged at the outer circumference of base flanges 56′, with which the lower pass forming members are all provided, and which ride upon a countersunk bottom 57 in the bed 24. The groove 56 is set into the under sides of these members just above their lower faces.

The members 32 are provided with enlarged under grooves 56 to permit of their sliding relatively with respect to the primary or larger members of the organization, it being understood that in the retractive movement these members slide back beyond the action of the springs under the wedging forces of the members 29 and 31.

Two encircling springs are provided to retract the upper pass forming members and these springs are indicated by reference characters 57′ and 58, the spring 57′ being arranged in a groove 59 in the sides of the pass forming members below the pass zone, and the spring 58 being trained about post 61 arranged upon the top of the members 44 and 45.

The top and bottom internal pass forming members are conjointly expanded and contracted by a vertically movable expander mechanism, which is moved down through the agency of the press part 42 when it descends to bring into operative position the upper external pass forming member 41. This expanding mechanism engages upwardly and outwardly inclined faces 62 and 63 on each upper minor internal pass forming member 46 and similarly inclined faces 60 on each lower internal pass forming member 32.

The expander mechanism comprises an upper expander head 64 having inclined faces 65 and 66 adapted to engage, respectively, the inclined faces 62 and 63 of the members 46. A stem 67 is threaded into and extends down through a lower expander head 69 which is provided with operative inclined faces 71 arranged to engage and cooperate with the faces 60 of the members 32. The expander head 69 is connected by a sleeve 72, with a base or body 73 located beneath the bed 24 and adapted to be locked to the expander stem 67 as expansion or contraction of the organization is desired.

The base 73 of the expander head 69 is arranged in a chamber 74 formed in part of a counterbore in the under side of the bed 24 and in part of a casing 75 bolted at 76 to the bed. The bed is apertured at 77 and the casing at 78; the one to permit the expander stem 67 and sleeve 72 to move vertically through the bed; and the other to permit free vertical movement of an enlarged end 79 on the stem 67.

Referring now to Figure 7, in which figure the parts are illustrated as being in body receiving position; i. e. with the expander mechanism in its raised position, it will be noted that the body 73 of the lower expander head 69 is locked to the expander stem 67 by a plunger 81 arranged in a bore 82 in the head and pressed against the stem by spring 83 and into a recess 84 therein.

The casing 75 is provided with a downwardly extending sleeve 85 up into which extends a dash pot mechanism comprising an outer wall 86, which is supported by a threaded shoulder 87 engaging within the extension 85. A spring 88 is located between the shoulder 87 and the under side of the head 79, and this spring, as will be later more fully explained, holds the parts in the elevated position shown in Fig. 7, and returns them thereto after each reforming operation.

The dash pot construction mentioned consists in the present instance of an oil cylinder filled with oil, as indicated at 89, and in which moves a flexible plunger 91 having bleeds 92 through it. The plunger 91 is secured on the end of a stem 93 which extends through a closure 94 at the top of the oil cylinder and through an opening 95 in the stem 67. A head 96 is arranged above the end of the stem and in a chamber 97 of the head 64 provided at the top of the bore into which the upper end of the stem 67 is threadingly engaged.

The head 96 supports all of the upper internal pass forming members and to this end an arm 98 is formed on each pass forming member 46. These arms extend through vertical slots 99 appropriately arranged through the walls of the expander, so that the arms 98 rest upon and are supported by the head 96 on the rod 93. It will be remembered that it has already been stated that the upper pass forming members 44 and 45 are interlockingly engaged with the members 46.

The first action in the forming of a container body is illustrated in Figure 3, to which attention is now directed: The outer pass forming member 41 descends with the press part 42, and within the outer expanding member 41 is arranged a contact plate 101 (Figs. 3 and 6), this contact member being secured by bolts 102 extending into the body of the member 41. The contact member 101 is adapted to engage the top of the upper expander head and as the outer pass forming member 41 moves down into pass forming position, the upper and lower internal pass forming members are all expanded to cooperate in the provision of the upper and lower passes.

The downward movement of the expander head to the position shown in Figure 3 accomplishes merely the expanding of the internal pass forming members through the sliding of the expander faces 65 and 66 on the faces 62 and 63 of members 46, and expander faces 71 on faces 60 of lower pass forming members 32, and the resulting wedging out of the internal pass forming members against the force of the various encircling springs. This arranges the parts so that the ends of the body are at or inserted within the entrances to the upper and lower reforming passes.

Continued downward movement (no interruption occurs at the point just above described) forces the ends of the container body through the passes, and during this movement the lower expander head 69 is held stationary through engagement of the body 73 with the lower wall of the casing 75, this being permitted because of the yielding character of the engagement between the plunger 81 and the stem 67. At the end of the down stroke, this plunger engages in a second locking recess 103 formed in the stem 67. It will be noted that during this downward movement of the expander organization, the dash pot plunger head 96 is held up against the arms 98 to the position shown in Fig. 4, the whole moving down together. It is also pointed out that during this action, as may be seen by comparing Figures 4 and 3, the inclined faces of the expander heads have passed beyond the inclined faces of the pass forming members, so that these members engage fixed abutments provided by the expander heads throughout the reforming action.

Immediately upon the completion of this reforming operation, the press part 42 ascends and no longer exerts influence upon the internal pass forming organization. As the press part 42 ascends, the spring 88 lifts the expander stem 67 and through it the two expanding heads 64 and 69, the locking plunger 81 remaining engaged in the upper locking recess. The first effect of this action is for the encircling springs arranged about the internal pass forming members to retract simultaneously with the upper and lower internal pass forming members to the position shown in Figure 5, the dash pot during this action holding the head 96 until it is engaged by the top of the stem 67.

As soon as the upper movement of the mechanism produces engagement of the lower expander head with the bed 24, the lower expander head comes to rest and the stem 67 continues its upward movement, lifting the upper internal pass forming organization to the position shown in Figure 7, at which time the locking plunger 81 enters the lower recess in the stem 67 and the parts are ready to operate upon the next container body.

I provide means for ejecting the container body out of engagement with the two outer pass forming members and these means consist of one or more pins 111 fixed in the lower expander body 73, and taking through openings 74' in the bed 24 in the presented flange of expanded member and into the pass itself.

At the top, I provide a ring 112 mounted within the outer pass forming member 41 and having a spider body 113 (Fig. 6). This spider is secured upon the end of a press part 113 extending through the press part 42. The spider is secured in place by a nut 114 adapted to move into a recess 115 in the contact member 101. The rod 113 is operated by the usual knockout mechanism to retard its upward ascent behind that of the member 42 to compel positive separation of the reformed or necked-in end of the container body from the outer expanding member 41.

Means are provided for reinforcing the container body against buckling during the reforming or necking-in operation, and these means comprise, in the present instance, extensions or portions of the internal pass forming members which form a telescoping structure arranged throughout the height of the body and in position to prevent movement of any of the body material inwardly during the operation. In explaining this feature, reference is had particularly to Figure 10 and incidentally to Figures 3 to 5.

The members 46 are extended downwardly throughout more than half the height of the body and the members 29 and 31 are extended upwardly past the lower end of the members 46. Of these, the members 29 extend upwardly in full face engagement with the interior of the tubular body, and the members 31 are cut back as indicated in Figures 11 and 10. The members 31 are arranged directly beneath the upper internal pass forming members 45, which are extended downwardly and provided with a thickness permitting them to fit nicely between the container body wall and upwardly extending parts of the members 39 (see Fig. 3). It will be noted that as the parts of the internal pass forming organization move downwardly, the percentage of the body wall of the container engaged by this reinforcing construction increases until at the end of the action substantially the entire inner surface of the container is reinforced.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. An apparatus for altering the shape and dimension of the ends of a metal tubular body comprising in combination, external and internal members forming a pass of the shape desired in an end of said body, with the entrance to the pass the diameter and shape of the original end of the body, means forcing the end edge of said body through said pass to reform the end thereof, the pass-forming members located in the direction of movement of the material of the body in reformation being capable of movement in said direction to permit removal of the body after the reforming operation, and collapsible means rigid when expanded for maintaning the shape and size of the body between its ends.

2. An apparatus for altering the shape and dimension of the ends of a metal tubular body, comprising in combination, internal and external reforming members located at the ends of the body and spaced apart to form passes therebetween of the shape and dimension desired in the finished end, and means causing relative approach of said members to force the ends of said body through said passes.

3. An apparatus for altering the shape and dimension of the ends of a metal tubular body, comprising in combination, internal and external reforming members located at the ends of the body and spaced apart to form passes therebetween of the shape and dimension desired in the finished end, and means causing relative approach of said members to force the ends of said body through said passes, the pass forming the members located in a direction of movements of the material of the ends of said body in the process of reformation having a movement in said direction to free the ends of the body and permit removal thereof.

4. An apparatus for altering the shape and dimension of the ends of a metal tubular body, comprising in combination, an internal segmental pass forming member and an external pass forming member, forming with the internal member a pass of the shape and dimension desired in the end of said body, and means moving said members conjointly to force the end of said body through said pass to reform it, said internal and external members being relatively fixed during said movement, and said internal member being collapsible to permit removal of said body and being rigid when expanded.

5. An apparatus for altering the shape and dimension of the ends of a metal tubular body, comprising in combination, external and internal pass forming members arranged to provide a pass of the shape and dimension desired in said reformation, means forcing the end of said body into said pass, said internal and external members being conjointly movable axially the body, to free the body after the reforming operation and said internal member being rigid when expanded.

6. An apparatus for altering the shape and dimension of the ends of a metal tubular body, comprising in combination, external and internal pass forming members arranged to provide a pass of the shape and dimension desired in said reformation, means forcing the end of said body into said pass, said internal and external members being conjointly movable axially the body, to free the body after the reforming operation, and said internal members being collapsible into a position out of contact with said body and being rigid when expanded.

7. An apparatus for altering the shape and dimension of the ends of a metal tubular body, comprising in combination, external and internal pass forming members arranged to provide continuous outer and inner walls of a pass of the shape and dimension desired in the reformation, means forcing an end of said body through said pass to reform the end thereof in accordance with the shape of the pass, the internal pass forming members being retractable out of engagment with the body to permit removal thereof and being rigid when expanded into contact with the body.

8. An apparatus for altering the shape and dimension of the ends of a metal tubular body, comprising in combination, outer and inner pass forming members arranged to provide a pass of the shape and dimension desired in the reformation, said inner pass forming members providing a continuous wall about the pass and being retractable after the pass forming operation to a position out of engagement with the wall of the body, a wedge member for moving said retractable members to body engaging position and holding them rigidly in said position and having opposed fixed members as contradistinguished from wedge engagement with said members when in pass forming position.

9. An apparatus for altering the shape and dimension of the ends of a metal tubular body, comprising in combination, external and internal pass forming members arranged to provide a pass of the shape and dimension desired in the reformation, means forcing an end of said body through said pass to reform the same, said internal members comprising a plurality of sets of retractable members together providing a continuous inner pass forming wall, said sets of members being successively movable to retracted position to free the body after reformation, and means for holding said members rigidly against the interior of said body.

10. An apparatus for altering the shape and dimension of the ends of a metal tubular body, comprising in combination, external and internal pass forming members arranged to provide a pass of the shape and dimension desired in the reformation, means forcing an end of said body through said pass to reform the same, said internal members comprising a plurality of sets of retractable members together providing a continuous inner pass forming wall, said sets of members being successively movable to retracted position to free the body after reformation, and a set controlling the movment of a second set, and means for holding said members rigidly against the interior of said body.

11. An apparatus for altering the shape and dimension of the ends of a metal tubular body, comprising in combination, external and internal pass forming members arranged to provide a pass of the shape and dimension desired in the reformation, means forcing an end of said body through said pass to reform the same, said internal members comprising primary pass forming members and secondary pass forming members arranged between said primary pass forming members and in wedging engagement therewith, and means for permitting first the movement of the secondary members out of pass forming position to remove the wedging relation, and subsequently the movement of the secondary members to free the body after reformation.

12. An apparatus for altering the shape and dimension of the ends of a metal tubular body, comprising in combination, an internal collapsible organization over which said body may be positioned, and having end portions, when expanded, of the shape desired at the inner face of the ends of said body, a fixed pass forming member cooperating with an end of said internal organization to form a pass of the shape and dimension desired in the finished body, a second outer pass forming member adapted to move into pass forming relation with the other end of the body, and means moving said second outer pass forming member and the adjacent end of the internal organization conjointly and without alteration of the shape of the pass, to force the ends of said body through two passes to reform said ends.

13. An apparatus for altering the shape and dimension of the ends of a metal tubular body, comprising in combination, an internal collapsible organization over which said body may be positioned, and having end portions, when expanded, of the shape desired at the inner face of the ends of said body, a fixed pass forming member cooperating with an end of said internal organization to form a pass of the shape and dimension desired in the finished body, a second outer pass forming member adapted to move into pass forming relation with the other end of the body, and means moving said second outer pass forming member and the adjacent end of the internal organization conjointly and without alteration of the shape of the pass, said internal pass forming members being retractable while said internal organization is shortened at the end of the reforming operation.

14. An apparatus for altering the shape and dimension of the ends of a metal tubular body, comprising in combination, outer and inner pass forming members arranged to provide a pass of the shape and dimension desired in the reformation, said internal pass forming members extending up throughout the length of the body to provide an internal rigid reinforce for the body during the reformation, and means forcing the end of the body through said pass, the central portions of the body sliding over said internal pass forming members to prevent collapse.

15. An apparatus for altering the shape and dimension of the ends of a metal tubular body, comprising in combination, outer and inner pass forming members arranged to provide a pass of the shape and dimension desired in the reformation, said internal pass forming members extending up throughout the length of the body to provide an internal rigid reinforce for the body during the reformation, and means forcing the end of the body through said pass, the central portions of the body sliding over said internal pass forming members to prevent collapse, and said internal pass forming members being retractable out of engagement with said body to permit removal of said body.

16. An apparatus for altering the shape and dimension of the ends of a metal tubular body, comprising in combination, lower external and internal pass forming members, upper external and internal pass forming members, all adapted to provide passes for the ends of the body of the shapes and dimensions desired in the reformation, means producing relative movement between the upper internal and external pass forming members and the lower internal and external pass forming members, said lower and upper internal pass forming members together continuously reinforcing rigidly the interior of the entire body against collapse in the reforming operation.

17. An apparatus for altering the shape and dimension of the ends of a metal tubular body, comprising in combination, a set of lower internal and external pass forming members adapted to provide a pass of the shape and dimensions desired in the presented end of the body, a set of upper internal and external pass forming members arranged to form a pass of the shape and dimension desired in the reformation of the presented end of the body, means moving said sets relatively to force the ends of the body through said passes and retractable to remove the outer wall of a said pass, and separate means for controllably retracting both upper and lower internal pass forming members to permit removal of the reformed body.

18. An apparatus for altering the shape and dimension of the ends of a metal tubular body, comprising in combination, a set of lower internal and external pass forming members adapted to provide a pass of the shape and dimension desired in the presented end of the body, a set of upper internal and external pass forming members arranged to form a pass of the shape and dimension desired in the reformation of the presented end of the body, means moving said sets relatively to force the ends of the body through said passes and retractable to remove the outer wall of a said pass, and separate means subsequently operable in timed relation for controllably retracting both upper and lower internal pass forming members to permit removal of the reformed body.

19. An apparatus for altering the shape and dimension of the ends of a metal tubular body, comprising in combination, external and internal pass forming members arranged to provide a pass of the desired shape and dimension of an end of a body, means forcing said end of the body through said pass to reform the same, means for moving the internal pass forming members from pass forming position, and a strip device movable to engage the reformed end of the body to strip it from the external pass forming member.

20. An apparatus for altering the shape and dimension of the ends of a metal tubular body, comprising in combination, internal and external pass forming members arranged to provide a pass of the shape and dimension desired in the reformation, said internal pass forming members being retractable after the reformation to permit removal of the body, and means locking said internal pass forming members rigidly in pass forming position.

21. An apparatus for altering the shape and dimension of the ends of a metal tubular body, comprising in combination, external and internal pass forming members arranged to provide a pass of the shape and dimension desired in said reformation, said pass forming members being conjointly movable throughout the reforming action, a said external pass forming member having independent movement from pass forming relation thereafter, and means locking said internal pass forming members rigidly in pass forming position throughout the reforming operation.

22. An apparatus for altering the shape and dimension of the ends of a metal tubular body, comprising in combination, external and internal pass forming members arranged to provide a pass of the shape and dimension desired in the reformation, said external and internal pass forming members being conjointly movable endwise against the body to force its end through said pass, a said external pass forming member being independently movable away thereafter, and means holding the internal pass forming members rigidly until after the movement of said external pass forming members.

23. An apparatus for altering the shape and dimension of the ends of a metal tubular body, comprising in combination, external and internal pass forming members arranged to provide a pass of the shape and dimension desired in the reformation and fixed against axial movement, means moving the end of the body to be reformed through said pass, and means arranged within the body to reinforce it rigidly against collapse.

24. An apparatus for altering the shape and dimension of the ends of a metal tubular body, comprising in combination, external and internal pass forming members arranged to provide a pass of the shape and dimension desired in the reformation, and means moving said internal and external dies axially down over the end of the body to force the same through said pass, together with means for resisting the movement of the body in the direction of the movement of said pass forming member.

25. The method of making a can body which consists in forming sheet metal into a tubular body, then expanding within the said body a rigid internal member to substantially conform and contact with the inner surface of said body, and then constricting and necking-in the end edges of the body by endwise and edgewise pressure on said body applied by narrow tapering passes of substantially the cross sectional area of the sheet metal of said body.

JOHN M. HOTHERSALL.